Sept. 17, 1935.   R. V. JUDSON   2,014,382
APPARATUS FOR CLEANING AND POLISHING GRAIN, SEED AND THE LIKE
Filed April 3, 1933   2 Sheets-Sheet 1
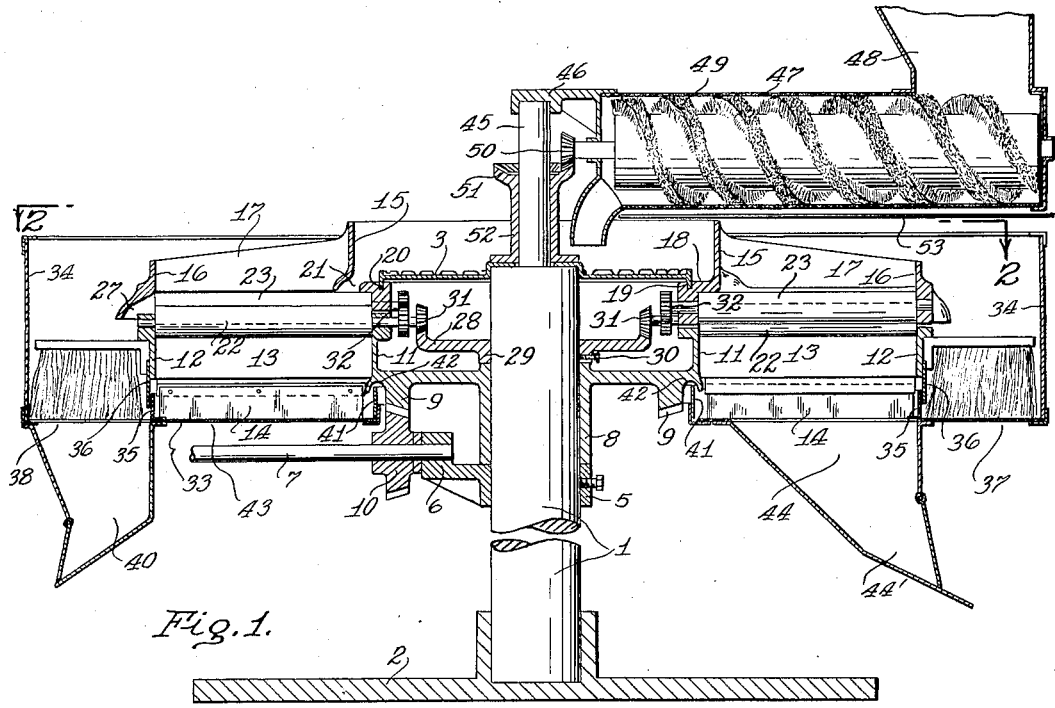
Fig. 1.
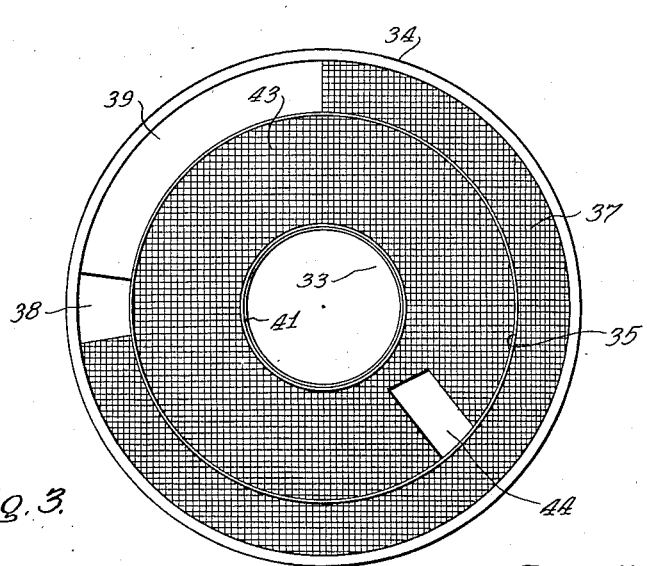
Fig. 3.
INVENTOR
Russell V. Judson
BY
ATTORNEYS Sept. 17, 1935.  R. V. JUDSON  2,014,382
APPARATUS FOR CLEANING AND POLISHING GRAIN, SEED AND THE LIKE
Filed April 3, 1933   2 Sheets-Sheet 2

INVENTOR
Russell V. Judson
BY
ATTORNEYS

Patented Sept. 17, 1935

2,014,382

UNITED STATES PATENT OFFICE 2,014,382

APPARATUS FOR CLEANING AND POLISHING GRAIN, SEED, AND THE LIKE

Russell V. Judson, Detroit, Mich.

Application April 3, 1933, Serial No. 664,075

3 Claims. (Cl. 209—12)

The present invention pertains to a novel apparatus for brushing screening grain, seed and the like and for separating the first class material from dust, dirt and inferior material.

The primary object of the present invention is to provide a machine including a brushing and screening means for supplying partly cleaned grain or the like to a centrifugal picking device that separates the good grain or the like from inferior grades and from dust, dirt and other foreign substances, the best grade of grain or the like being delivered to a brushing mechanism that further cleans and polishes the same, while the inferior grade and cull is delivered to a mechanism that screens the same and delivers it out a spout in a condition suitable for stock food.

With the above and other ends in view the invention consists in matters hereinafter set forth and more particularly pointed out in the appended claims, reference being had to the accompanying drawings, in which Figure 1 is a vertical cross section;

Fig. 3 is a plan view of the polishing and cull cleaning casing;

Like characters of reference are employed throughout to designate corresponding parts.

Figure 2:
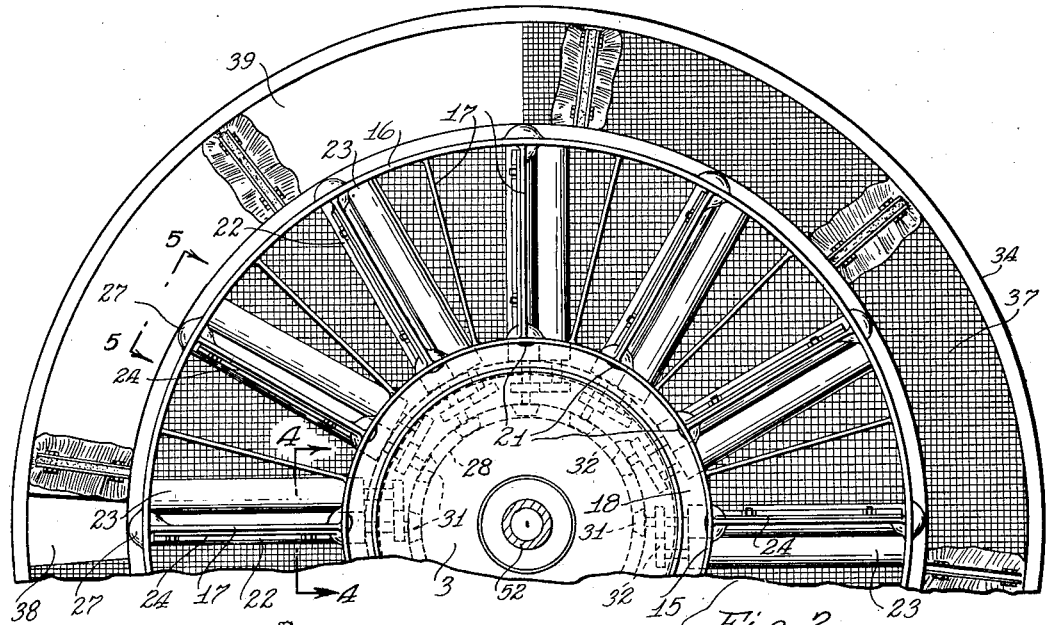
Fig. 2 is a view taken substantially along the line 2—2 of Fig. 1.

The numeral 1 designates a vertical post that is mounted in a base 2 that may be secured to a floor or similar support or which may be mounted upon a wheeled truck in cases where it is desirable that the apparatus to be described should be portable. It will be understood that additional support may be provided for the apparatus, such as a rigid frame construction but inasmuch as the particular supporting mechanism used in addition to the post 1 forms no essential part of the invention the same has been omitted from the drawings for the sake of clarity.

Rotatably supported on top of the post 1 is a circular grain distributing disk 3, and beneath the disk 3 on the post 1 is secured a bracket 5 that supports a bearing 6 for the inner end of a shaft 7 that may be rotated by hand, by motor, or in the case of a wheeled truck support it may be rotated by a power take-off that is driven by the propelling motor of the truck.

Supported on the post 1 by the bracket 5 is the hub 8 of a downwardly facing horizontal rack 9 that constantly meshes with a bevelled pinion 10 suitably secured on the shaft 7. The rack 8 constitutes a bevelled gear wheel and is formed as part of a rotary circular carrier comprising an inner ring 11 and an outer ring 12 that are joined by webs 13. To the bottom of certain of the webs 13 are secured flexible scrapers 14, there being a number of between eight and fifteen evenly distributed throughout the circle.

Above the above described carrier is mounted a second rotary circular carrier comprising an inner ring 15 and an outer ring 16, the two rings being joined by webs 17. The inner ring 15 surrounds the distributing disk 3 and is provided with a horizontal wall 18 that is grooved as at 19 to receive a downwardly extending rib 20 on the distributing disk. The inner ring 15 and horizontal wall 18 are provided with a series of equally spaced apertures 21.

Figure 4:
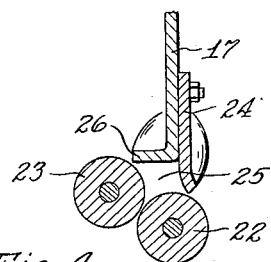
Fig. 4 is a cross section along the line 4—4 of Fig. 2.
Figure 5:
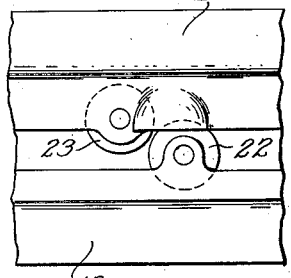
Fig. 5 is a fragmentary view taken along the line 5—5 of Fig. 2.

The two circular carriers are secured together in any suitable manner so that they rotate in unison and cause rotation of the distributing disk 3 when the pinion 10 is caused to rotate by applying rotative pressure upon the shaft 7 in any suitable manner. Beneath each aperture 21 is mounted a pair of rollers 22 and 23, the roller 22 being rotatably supported between the rings 11 and 12, and the roller 23 being rotatably mounted between the rings 15 and 16. This manner of supporting the rollers permits the same to be associated as illustrated in Fig. 4 so that by mounting guides 24 on the webs 17 a passage 25 is formed into which grain enters through the apertures 21. Each passage 25 is defined by a flange 26 on a web 17, a guide 24 and the rollers 22 and 23, and the latter are preferably formed of material such as rubber and are spaced apart a distance of approximately one thirty-second of an inch. The ring 16 is provided with an aperture 27 adjacent the outer end of each pair of rollers 22 and 23.

A bevelled gear wheel 28 is provided with a hub 29 that is fixed to the post 1 by securing means 30, the gear 28 being constantly in mesh with bevelled pinions 31, there being one of such pinions connected to each roller 32. Both rollers 22 and 23 are geared together as at 32.

Beneath the circular rotary carriages is mounted a screen bottom casing 33 that has an outer, vertically extending, ring-like wall 34 spaced outwardly from the rings 12 and 16. An upwardly extending partition 35 is secured to the casing 33 and cooperates with a downwardly extending partition 36 secured to the ring 12 in forming an annular track 37. An outlet 38 is formed in the track 37 and it will be noted that a section of the track on one side of the outlet is left solid as at 39. Beneath the outlet 38 there is mounted a discharge chute 40. Radially extending brushes 60 are secured on the ring 12 to extend into the track 37.

The casing 33 is provided with a central opening that is surrounded by a vertical wall 41 that is received in a groove 42 formed in the bottom of the inner ring 11. It will be observed that a second track 43 is formed by the wall 41 and the partition 35 and an outlet 44 is formed in the track 43 and equipped with a discharge chute 44'.

The post 1 is provided with a vertical extension 45 that supports a bearing 46 that supports one end of a cylindrically shaped screen casing 47. Any suitable framework may be employed to support the other end of the casing. A hopper 48 is mounted in the top of the casing 47 adjacent the outer end thereof and a cylindrical screw type brush 49 is mounted in the casing and has a bevelled pinion 50 on its inner end meshing with a bevelled gear 51 whose hub 52 surrounds the extension 45 and is connected to the central part of the distributing disk 3. A shield 53 may be mounted beneath the casing 47 if desired to prevent dust and dirt from said casing falling on the circular rotary carriers.

Figure 6:
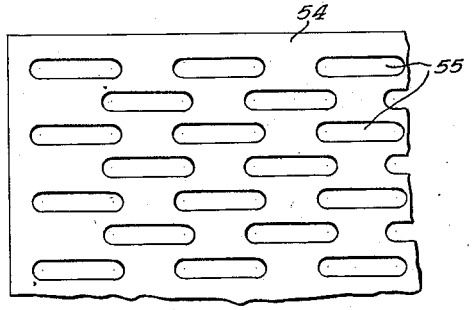
Fig. 6 is a fragmentary view of the preferred screen construction.

In the drawings, for the sake of clarity, the screening has all been illustrated in conventional manner, but it will be understood that the preferred type of screen is illustrated in Fig. 6 and comprises sheet metal 54 having symmetrically formed and spaced openings 55, the size of the openings varying with requirements defined by the size of the particular type of grain seeds or the like which are to be handled.

In operation, the grain, seed or the like is poured in the hopper 48 and the shaft 7 is caused to rotate, it being understood that the circular rotary carriers, the distributing disk 3, and screw brush 49 all rotate simultaneously. The brush screw 49 moves the grain from one end to the other of the screen casing 47, the brush causing the grain to roll and tumble throughout this passage and eliminate a portion of the dust, dirt, etc. that is mixed with the grain. The casing 47 discharges the grain on the distributing disk 3 and the centrifugal force set up by rotation of the disk causes the grain to be impelled outwardly onto the horizontal wall 18 and then through the apertures 21 into the passages 25 and directly on top of the rollers 22 and 23. The good stock which is ordinarily glazy or has a hard smooth surface is propelled across the rollers 22 by the centrifugal force set up by rotation of the rotary circular carriages while lumps of dirt, rotted kernels and such material are drawn through the rollers.

The stock that passes over the rollers also passes through the apertures 27 and falls into the track 37 and the brushes 60 roll and tumble the same over the screen portion thereof to remove dust and dirt therefrom and to polish the same and brush the same around said track until it falls through the opening 38.

The stock that passes between the rollers 22 and 23 falls into the track 43 and the scrapers 14 on the webs 13 cause the same to be moved over the screen bottom of said track to screen dust and dirt and small particles therefrom and deliver that which remains to the outlet 44 so that such stock is suitable for cattle fodder without additional treatment.

It becomes obvious, from the foregoing, that the grain is screened at the same time it is fed into the picking mechanism and that the selected stock is brushed and polished, and that the refuse is cleaned to such an extent that it is suitable for cattle fodder.

Although a specific embodiment of the present invention has been illustrated and described it is to be understood that various changes may be made in the details of construction without departing from the spirit of the invention as set forth in the appended claims, and such changes are contemplated.

What I claim is:

1. In combination a machine including a rotatable frame and pairs of rollers arranged in said frame, a pair of separated annular screens arranged one within the other, the inner screen being disposed beneath said rollers and the outer screen being disposed adjacent to and in a plane beneath the outer ends of said rollers, brush elements carried by said frame and disposed within said inner screen, brush elements carried by said frame and extending into said outer screen, and separate discharge means for each of said screens.

2. In combination with a bean picking machine including pairs of rollers mounted in a rotatable frame, a distributing disk rotatable with said frame, a supply mechanism including a cylindrical screen having a discharge opening over said disk, a spiral brush in cylindrical screen, driving elements connecting said disk and spiral brush whereby they rotate in said unison, and a stationary annular screen arranged beneath said rollers, brush elements carried by said frame for moving the material which falls through said screen relative to said annular screen, an annular cleaning and polishing screen arranged around said first named annular screen, and brushes carried by said frame and extending into said cleaning and polishing screen for moving the stock which passes over said rollers relative to said screen.

3. In combination a machine including a rotatable frame and pairs of rollers arranged in said frame, of a pair of separated annular screens arranged one within the other, the inner screen being disposed beneath said rollers and the outer screen being disposed adjacent to and in a plane beneath the outer ends of said rollers, brush elements carried by said frame and disposed within said inner screen, brush elements carried by said frame and extending into said outer screen, said outer screen having a polishing portion, and separate discharge means for each of said screens.

RUSSELL V. JUDSON.